United States Patent
Chang et al.

(10) Patent No.: US 7,455,466 B2
(45) Date of Patent: Nov. 25, 2008

(54) MAGNETIC ACTUATOR FOR ADJUSTING AN IRIS DIAPHRAGM IN AN OPTICAL DEVICE

(75) Inventors: Chii-How Chang, Taoyuan Hsien (TW); Sean Chang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 373 days.

(21) Appl. No.: 11/194,566

(22) Filed: Aug. 2, 2005

(65) Prior Publication Data

US 2006/0028312 A1 Feb. 9, 2006

(30) Foreign Application Priority Data

Aug. 4, 2004 (TW) .............................. 93123325 A

(51) Int. Cl.
*G03B 9/02* (2006.01)
*G03B 9/08* (2006.01)
(52) U.S. Cl. ..................... 396/508; 396/463; 335/222; 335/229
(58) Field of Classification Search ......... 335/148–150, 335/222, 229–234; 310/27, 36, 37; 362/321–325; 396/463–470, 505–510
See application file for complete search history.

(56) References Cited

U.S. PATENT DOCUMENTS

| 4,758,750 | A | * | 7/1988 | Itagaki et al. | .................. 310/13 |
| 4,808,955 | A | * | 2/1989 | Godkin et al. | .............. 335/222 |
| 4,882,508 | A | * | 11/1989 | Mawla | ........................ 310/13 |
| 7,161,768 | B1 | * | 1/2007 | Oveyssi | ................... 360/264.8 |

* cited by examiner

*Primary Examiner*—Ramon M Barrera
(74) *Attorney, Agent, or Firm*—Birch, Stewart, Kolasch & Birch, LLP

(57) ABSTRACT

A magnetic actuator. A yoke comprises a first opening and a second opening, a frame, and a path. A first magnet is disposed in the first opening in the vicinity of the frame. A second magnet is disposed in the second opening in the vicinity of the frame. A coil comprises a wire surrounding the path. A light shield is connected to an end of the coil. When current passes through the coil, the coil moves along the path by magnetic induction between the first magnet and the second magnet such that the iris diaphragm is adjustable by the light shield.

19 Claims, 12 Drawing Sheets

MAGNETIC ACTUATOR FOR ADJUSTING AN IRIS DIAPHRAGM IN AN OPTICAL DEVICE

BACKGROUND

The invention relates to a magnetic actuator, and in particular to a magnetic actuator used with an iris diaphragm.

Optical devices such as optical projectors, rear projectors, or cameras comprise a light control device such as an iris diaphragm controller, adjusting light intensity to produce images of different light intensity. Conventional iris diaphragm controllers are controlled by a dynamic or magnetic mechanism.

A conventional iris diaphragm controller 1 is shown in FIGS. 1A to 1E, comprising a yoke 10, a first magnet 11., a second magnet 12, a coil 15, a light shield 16, and a shaft 17. The yoke 10 is a rectangular piece with a hole 107 defined therein. Conventionally, the yoke 10 comprises two U-shaped pieces with ends thereof facing each other. The first magnet 11 and second magnet 12 are disposed in the hole 107 of the yoke 10, respectively on opposing sides thereof The first magnet 11 and second magnet 12 are arranged with opposite polarities facing each other, as shown in FIG. iC. The North pole of the first magnet 11 is located at the left side of the coil 15, and the South pole thereof is located at the right side. The polarity of the second magnet 12 is opposite to the first magnet 11 such that an upward magnetic field is generated on the right side of the coil 15, and a downward magnetic field is generated on the left side. The coil 15 comprises electric wires, located between the first magnet 11 and the second magnet 12. The shaft 17 extending from a side of the coil 15 comprises an opening 170. The light shield 16 is connected to the coil 15 on an opposite end of the shaft 17. The light shield 16 is normally disposed along the light path, perpendicular thereto to block light.

As shown in FIGS. 1C to 1E, when current passes through the coil 15 in the direction of the solid arrows in FIG. 1D, since current flows from right to left on the upper side of the coil 15, the magnetic field is perpendicular thereto and oriented from the FIG. 1D. According to the right hand rule, the coil 15 produces upward force. Since the shaft 17 is connected to a side of the coil 15, and another shaft (not shown) pivots on the opening 170, the coil 15 moves with respect to the opening 170 as a center point along the cross section line A-A'. That is, the coil 15 moves counterclockwise as shown by the hollow arrow of FIG. 1D. The lower side of the coil 15 is used as an example, wherein when current flows from left to right, the magnetic field is perpendicular thereto and oriented into the FIG. 1D. According to the right-hand-rule, the coil 15 produces upward force. The coil 15 moves around the opening 170 as a center point along the cross section line A-A', in a counterclockwise direction shown by the hollow arrow of FIG. 1E. As a result, the coil 15 moves the light shield 16 with respect to the opening 170, as shown in FIG. 1E in a counterclockwise direction. If current volume is adjusted accurately, angle of the circular motion of the coil 15 can be controlled such that the light shield 16 controls the size of the iris diaphragm.

However, the structure of the coil is complicated and difficult to fabricate, elevating manufacturing costs. Furthermore, since the magnetic fields generated by the magnetic structure thereof are not uniform, the relationship between the current volume in the coil and the circular motion is difficult to control. To achieve sufficient actuating force for the magnetic actuator, volume is increased, and the width thereof cannot be reduced.

SUMMARY

A magnetic actuator is provided, for adjusting an iris diaphragm, applicable in an optical device, comprising a yoke, a first magnet, a second magnet, and a coil. The yoke comprises a first opening and a second opening, a frame encircling the first opening and the second opening, and a path between the first opening and the second opening. The cross section of the path can be circular, rectangular or polygonal. The first magnet is disposed in the first opening in the vicinity of the frame. The second magnet is disposed in the second opening in the vicinity of the frame. The coil comprises a wire surrounding the path. The light shield is connected to an end of the coil. When current passes through the coil, the coil moves back and forth along the path by magnetic induction between the first magnet and the second magnet such that the iris diaphragm is adjustable by the light shield.

Additionally, the yoke comprises two L-shaped yoke plates and a U-shaped yoke plate. The L-shaped yoke plates are disposed symmetrically, constituting the path and one side of the frame, and the U-shaped yoke plate constitutes the other three sides of the frame.

The yoke may alternatively comprise two U-shaped yoke plates and a flat yoke plate. Each U-shaped yoke plate comprises a side, the sides thereof symmetrically arranged, contacting each other and pointing in the same direction to form the path and the three sides of the frame. The flat yoke plate forms the fourth side of the frame.

DESCRIPTION OF THE DRAWINGS

The invention can be more fully understood by reading the subsequent detailed description in conjunction with the examples and references made to the accompanying drawings, wherein.

DETAILED DESCRIPTION

Figure 1A:
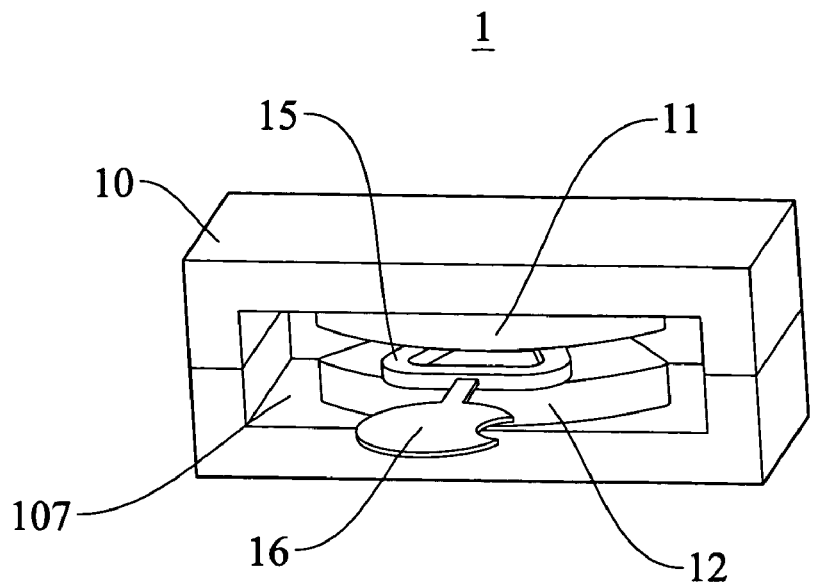
FIG. 1A is a schematic perspective view of a conventional iris diaphragm controller.
Figure 1B:
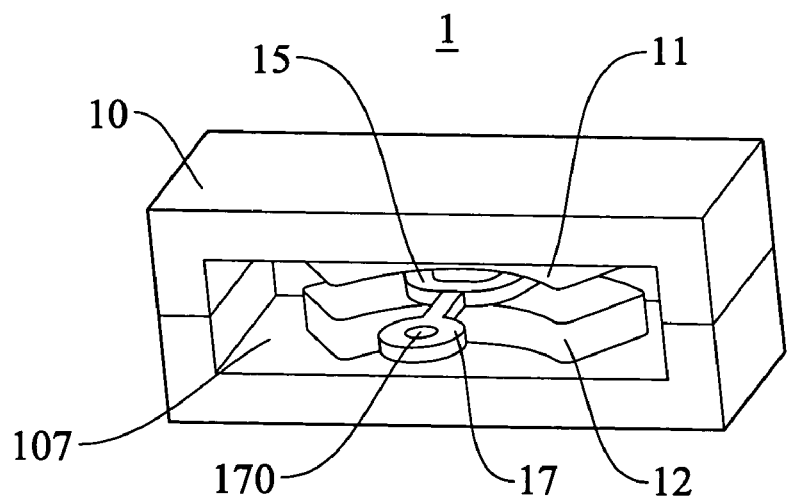
FIG. 1B is a schematic perspective view of the conventional iris diaphragm controller from another viewing angle.
Figure 1C:
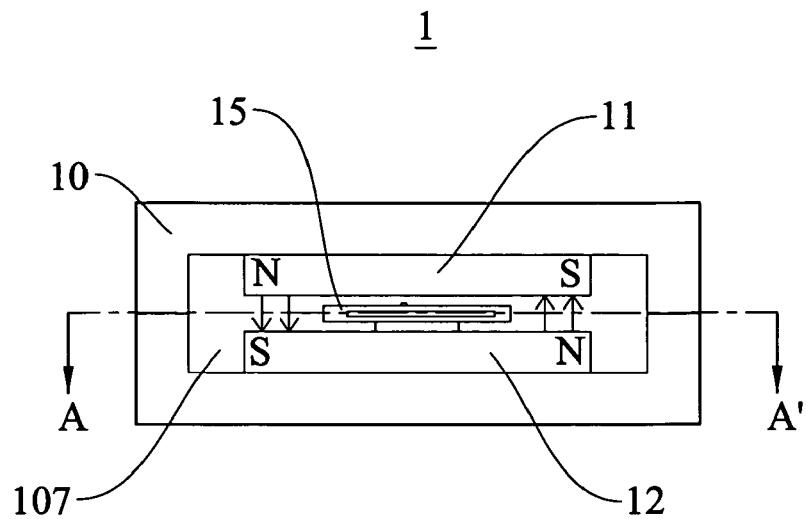
FIG. 1C is a front view of a conventional iris diaphragm controller.
Figure 1D:
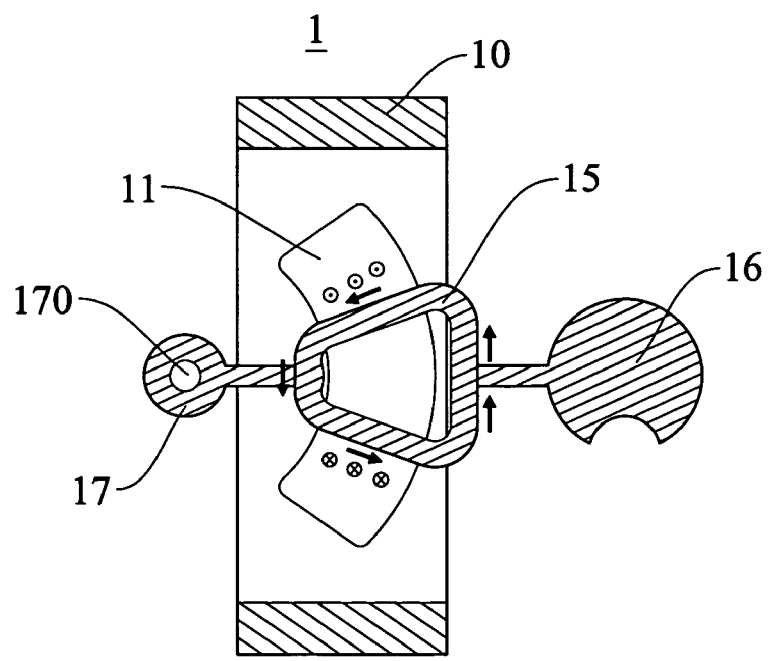
FIG. 1D is a cross section along a line A-A' of FIG. 1C.
Figure 1E:
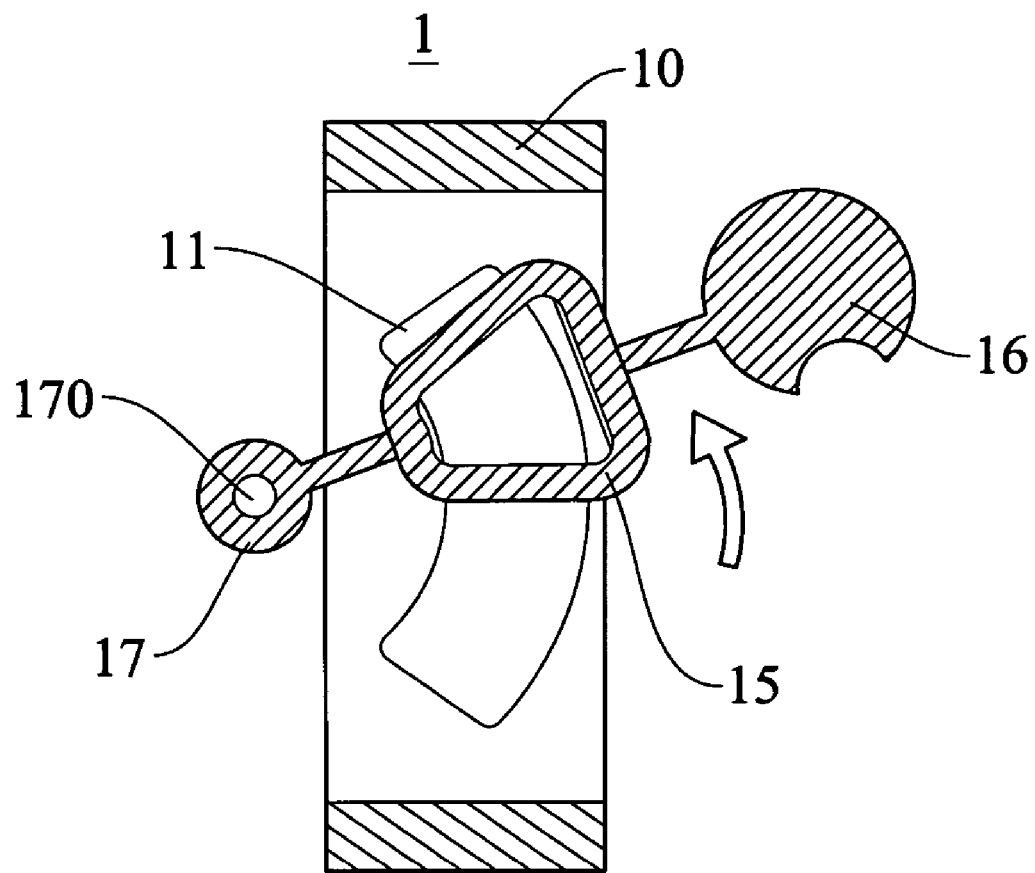
FIG. 1E is a cross section along a line A-A' of FIG. 1C with a light shield adjusting the size of iris diaphragm.
Figure 2A:
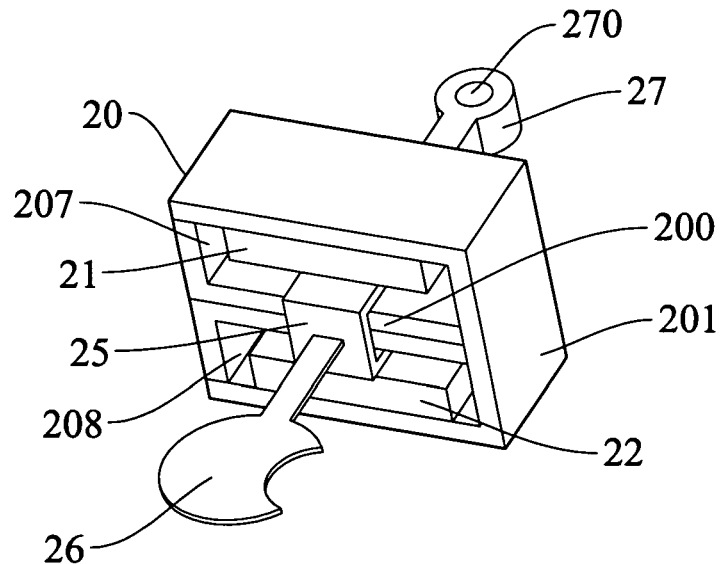
FIG. 2A is a perspective view of an embodiment of a magnetic actuator.
Figure 2B:
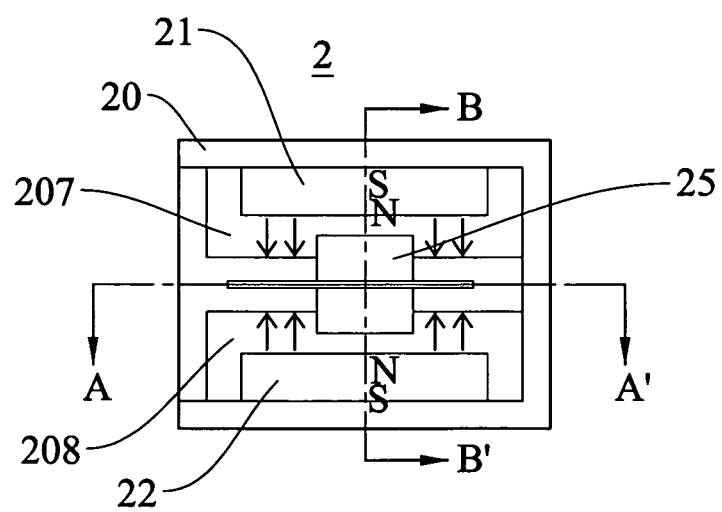
FIG. 2B is a front view of the magnetic actuator of FIG. 2A.

FIGS. 2A to 2D are schematic views of an embodiment of a magnetic actuator 2, comprising a yoke 20, a first magnet 21, a second magnet 22, a coil 25, and a light shield 26. The yoke 20 comprises a first opening 207 and a second opening 208, a frame 201 encircling the first opening 207 and the second opening 208, and a path 200 therebetween, as shown in FIG. 2B. The yoke 20 forms a FIG. 8 from a front view. The first magnet 21 and the second magnet 22 are disposed in the first opening 207 and the second opening 208, respectively, in the vicinity of the frame. The first and second magnets 21 and 22 have facing polarity such that, as shown in FIG. 2B. The first magnet 21's South pole faces up and North pole faces down, opposite to the North pole of the second magnet 22, and South pole facing down. Magnetic field from top to bottom is generated in the first hole 207, and another magnetic field from bottom to top is generated in the second hole 208. If the size and shape of the first and second magnets 21 and 22 are substantially the same, the sizes of the magnetic fields are substantially equal. Note that the polarities of the first and the second magnets 21 and 22 can be opposite, providing the same result. The coil 25 comprises a wire (not shown) surrounding the path 200. The shaft 27 extending from a side of the coil 25 comprises a hole 270. The shaft 27 can be perpendicular to the path 200. Another shaft (not shown) pivots on the hole 270. The light shield 26 is connected to another end of the coil 25 opposite the hole 270. The light shield 26 is disposed on light path of the optical device with a moving direction perpendicular thereto to block light. The shape of the light shield 26 is not limited, as long as it can block light.

Figure 2C:
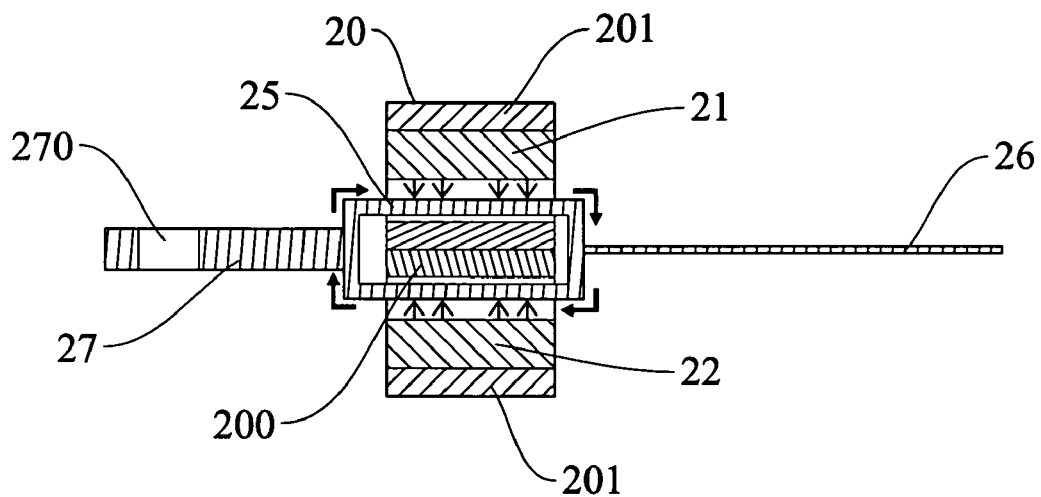
FIG. 2C is a cross section along a line B-B' of FIG. 2B.
Figure 2D:
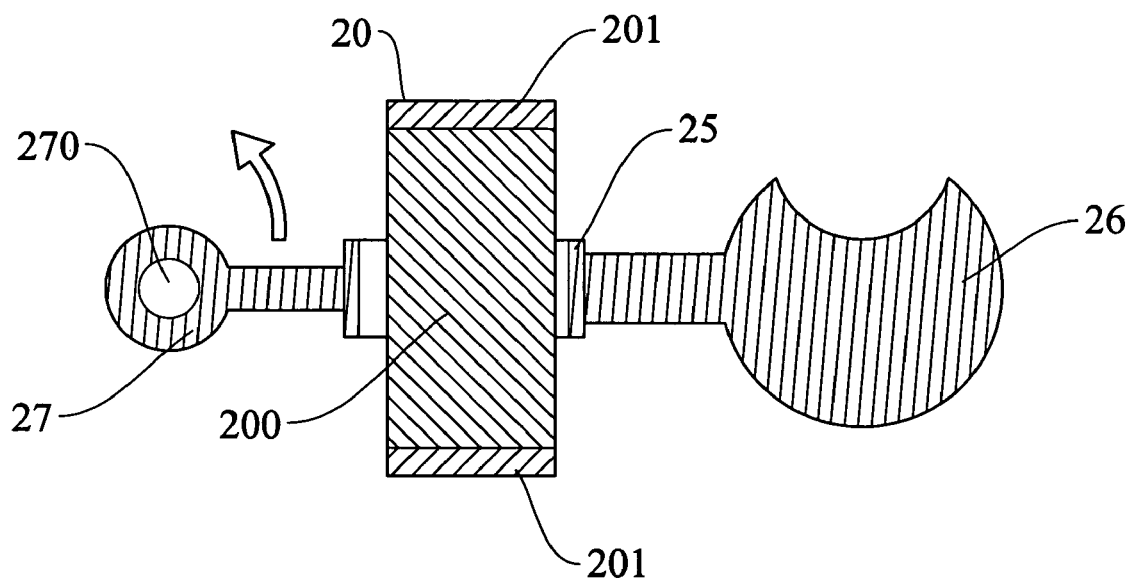
FIG. 2D is a cross section along a line A-A' of FIG. 2B.

As shown in FIGS. 2B to 2D, current flows through the coil 25, in the direction is shown by the solid arrow of FIG. 2C. As shown in FIG. 2C, the current flow direction on the upper side of the coil 25 is from left to right, and magnetic field from top to bottom. According to the right-hand rule, a force produced by the coil 25 is perpendicular to the magnetic field and the current. The direction of the force is oriented into the FIG. 2C. The current in the lower portion of the coil 25 flows from right to left, and magnetic field moves from bottom to top. According to the right-hand rule, a force produced by the coil 25 is also perpendicular to the magnetic field and the current. Consequently, the coil 25 moves along cross section line A-A', and since the coil 25 is connected to the shaft 27 and another shaft (not shown) pivots on the hole 270, the coil 25 moves with respect to the hole 270 as a center point in a counter-clockwise circular motion. The direction of the motion is shown by an hollow arrow in FIG. 2D. Thus, the coil 25 can move the light shield 26 around the hole 270 in a counter-clockwise circular motion. If the current volume in the coil 25 is controlled, the angle of the circular motion of the coil 25 can be controlled such that the light shield 26 can adjust the size of the iris diaphragm.

Accordingly, the combination of magnet and path of the yoke provides a uniform magnetic field, which, being encircled by the coil, causes the upper and lower portions of the coil to be both magnetically induced by the magnetic field, providing more efficient actuating power than prior art with the same coil and same size structure.

Figure 3A:
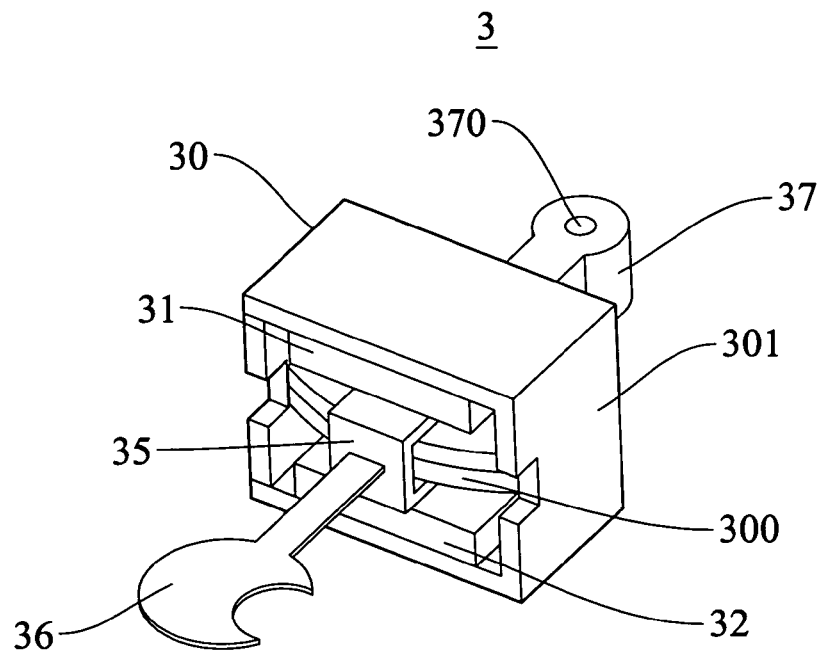
FIG. 3A is a perspective view of another embodiment of a magnetic actuator.
Figure 3B:
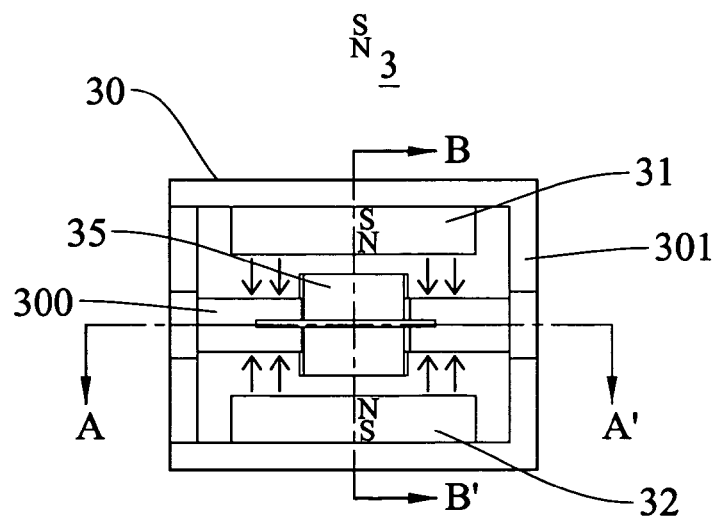
FIG. 3B is a front view of the magnetic actuator of FIG. 3A.
Figure 3C:
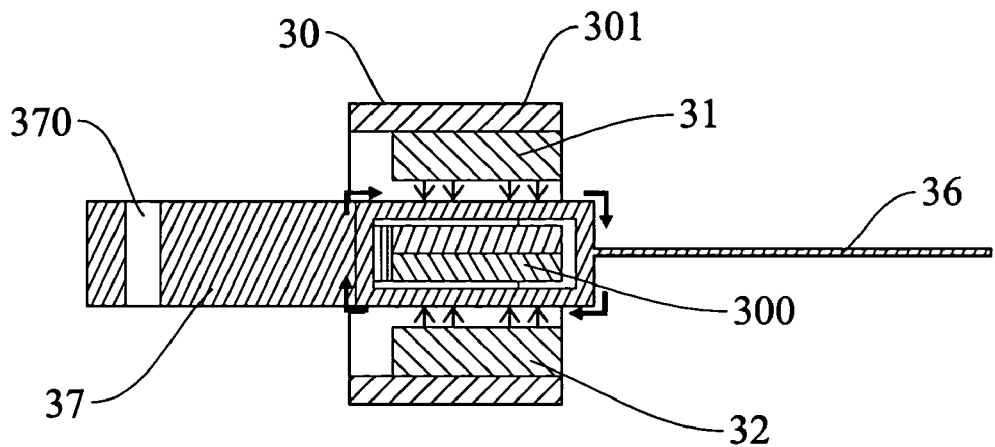
FIG. 3C is a cross section along a line B-B' of FIG. 3B.
Figure 3D:
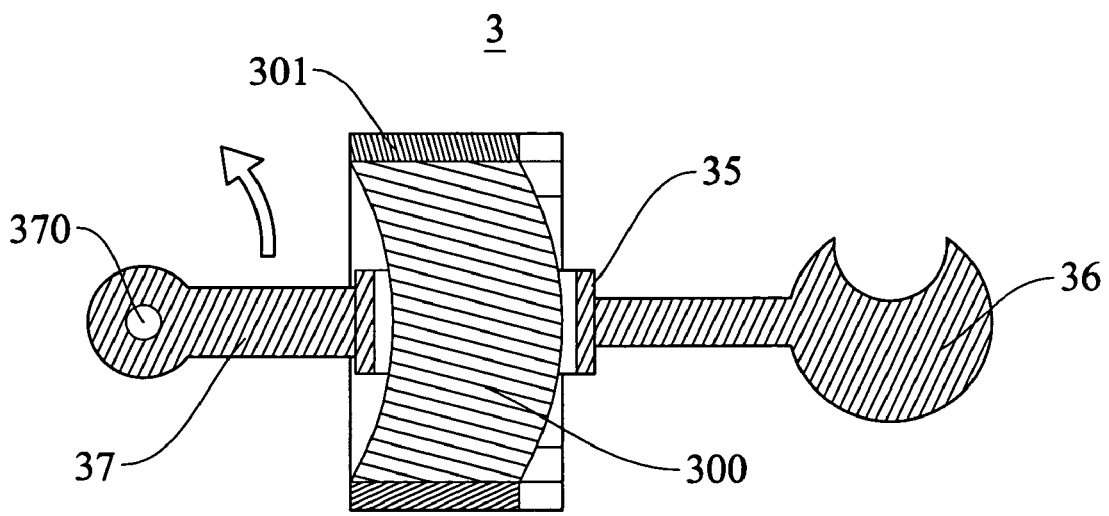
FIG. 3D is a cross section along a line A-A' of FIG. 3B.

FIGS. 3A to 3D are perspective views of an embodiment of another magnetic actuator 3, comprising a yoke 30, a first magnet 31, a second magnet 32, a coil 35, a shaft 37 comprising a hole 370, and a light shield 36. Here, a cross section of path 300 of the yoke 30 can be circular, as shown in FIG. 3D, rectangular, as shown in FIG. 2D, or polygonal (not shown). When the coil 35 moves with respect to the hole 370 in a circular motion, the coil 35 is not worn due to preventing from contact with the path 300 during rotation.

Figure 4:
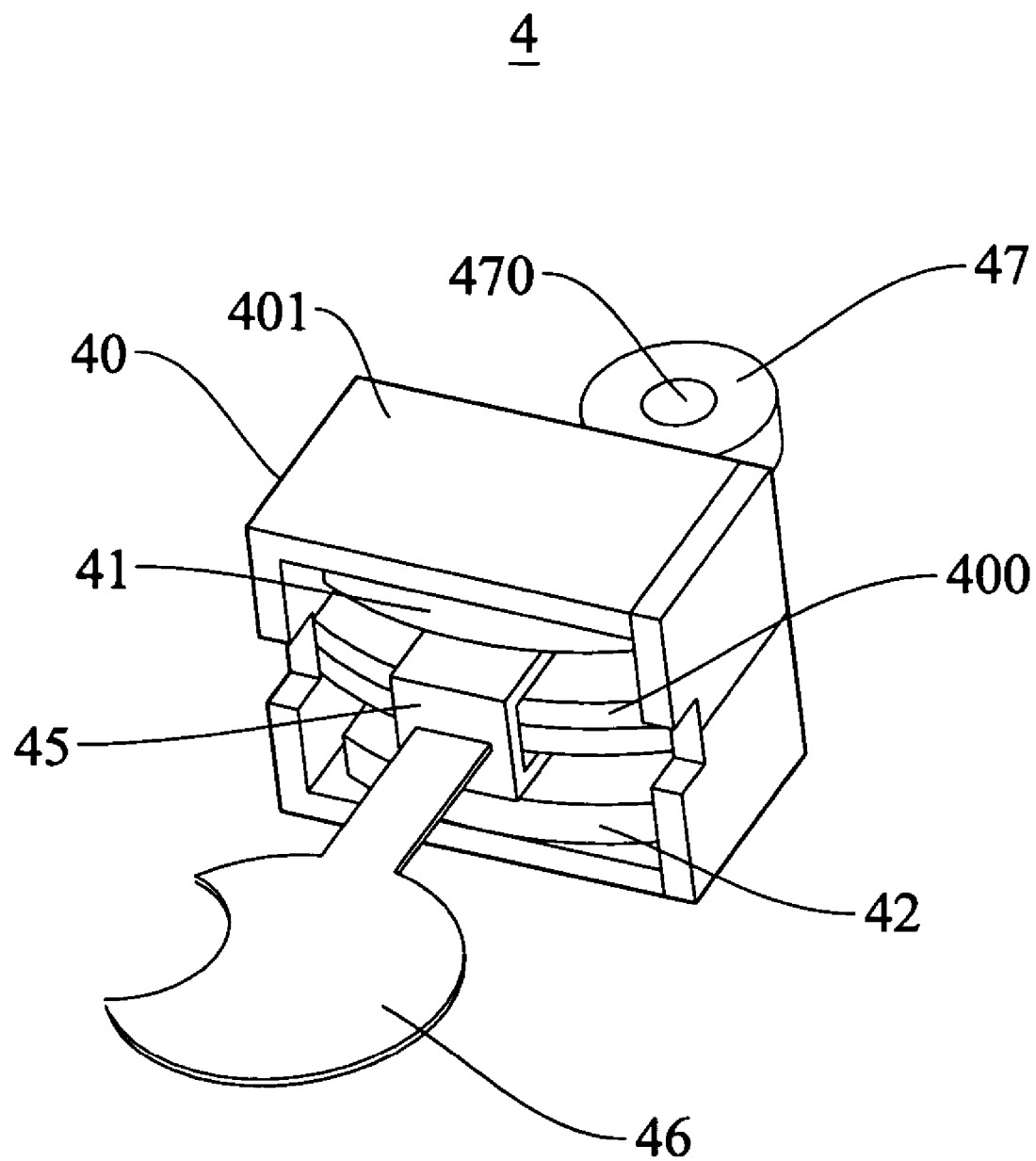
FIG. 4 is a perspective view of yet another embodiment of a magnetic actuator.

FIG. 4 is a perspective view of another embodiment of a magnetic actuator 4, in which cross sections of the first magnet 41 and the second magnet 42 are circular, although they can be polygonal (not shown). If the first magnet 41 and the second magnet 42 are of the same size and shape, when the coil 45 moves with respect to the hole 470 in a circular motion, the coil 45 is not worn due to preventing from contact with the path 400 during rotation. The coil 45 does not depart from the magnetic field of the first magnet 41 and the second magnet 42 such that the coil 45 moves in a uniform magnetic field. Thus, the current volume of the coil 45 linearly varies with the angle of circular motion of the coil 45, providing predictable efficiency for the magnetic actuator 4.

Figure 5A:
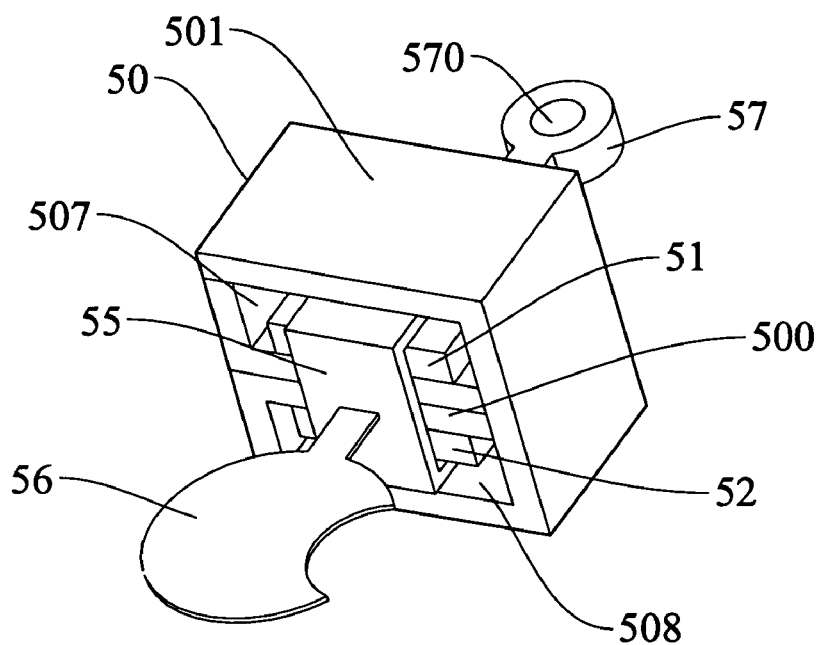
FIG. 5A is a perspective view of still another embodiment of a magnetic actuator.
Figure 5B:
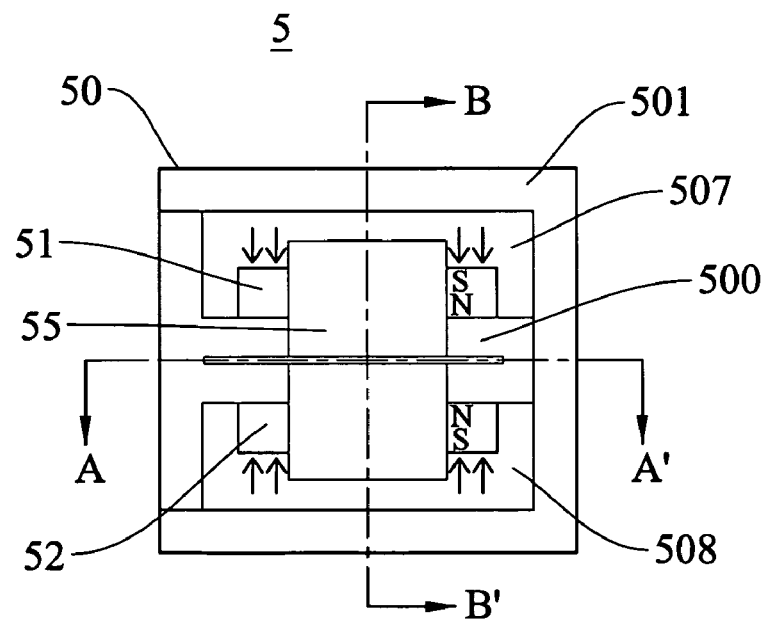
FIG. 5B is a front view of the magnetic actuator of FIG. 5A.

FIGS. 5A to 5D are perspective views of another magnetic actuator 5, comprising a yoke 50, a first magnet 51, a second magnet 52, a coil 55, a shaft 57 comprising a hole 570, and a light shield 56. Here, the first magnet 51 is disposed in a first opening 507, and the second magnet 52 is disposed in a second opening 508, the first magnet 51 and the second magnet 52 contacting two sides of the path 500. The first magnet 51 and the second magnet 52 have the same polarity facing each other. As shown in FIG. 5B, the first magnet 51 has a North pole facing down and a South pole facing up. The second magnet 52 has a North pole facing the North pole of the first magnet 51. Thus, a magnetic field from top to bottom is generated in the first opening 507. Another magnetic field from bottom to top is generated in the second opening 508. If the first magnet 51 and the second magnet 52 are of the same size and shape, the magnetic fields have the same magnitude. The coil 55 encircles the path 500, the first magnet 51, and the second magnet 52. The motion of this embodiment is as follows.

Figure 5C:
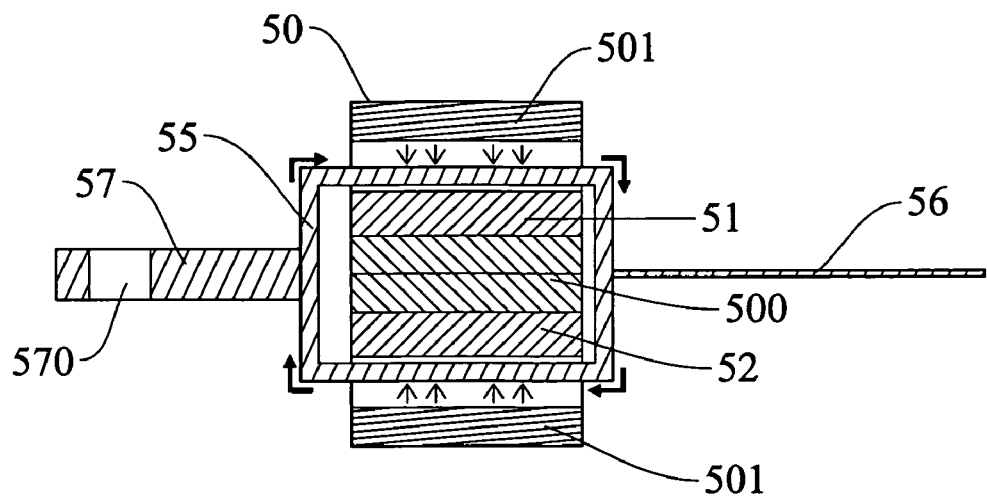
FIG. 5C is a cross section along a line B-B' of FIG. 5B.
Figure 5D:
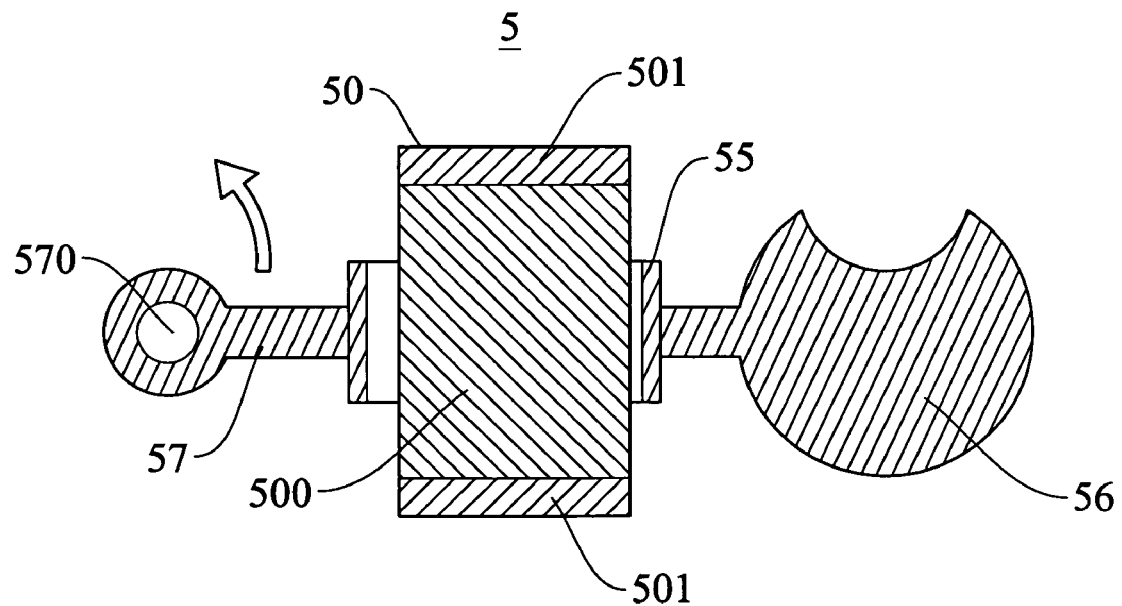
FIG. 5D is a cross section along a line A-A' of FIG. 5B.

As shown in FIGS. 5B to 5D, when current passes through the coil 55, the flow direction of the current is represented by the solid arrow in FIG. 5C. The current flows from left to right on the upper side of the coil 55, and the magnetic field from up to bottom. According to the right hand rule, the coil 55 produces force perpendicular to the magnetic field and the current. The direction of the force is oriented into the FIG. 5C. Alternatively, when the current flows from right to left on the lower side of the coil 55, the magnetic field is from bottom to top, and thus, the force produced by the coil 55 is perpendicular to the magnetic field and the current. The direction of the force is oriented from the FIG. 5C. Thus, the coil 55 moves along the cross section line A-A' back and forth. Moreover, the coil 55 is connected to the shaft 57 comprising the hole 570, and another shaft (not shown) pivots on the hole 570. As a result, the coil 55 is moved with respect to the hole 570 as a center point in a counterclockwise circular motion along the cross section line A-A', as shown by the hollow arrow in FIG. 5D. Thus, the light shield 56 is driven by the coil 55 to move in a counterclockwise circular motion. If the current volume in the coil 55 is controlled, the angle of the circular motion of the coil 55 can be controlled such that the light shield 56 can adjust the size of the iris diaphragm.

Figure 6A:
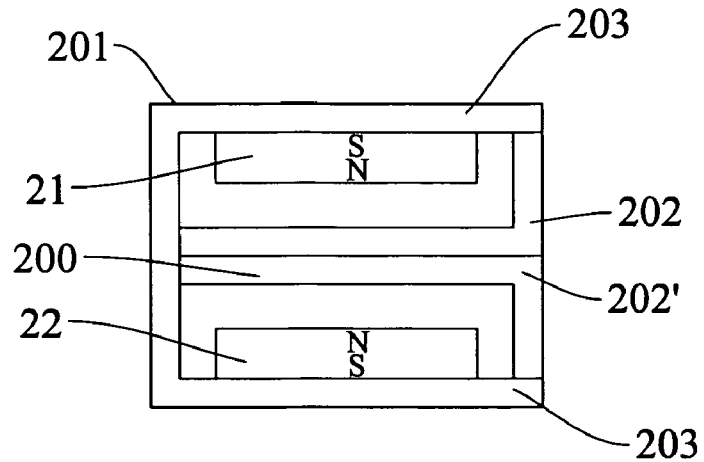
FIG. 6A is a cross section of a yoke, a first magnet, and a second magnet of embodiments of a magnetic actuator.

Generally, the yokes as disclosed form a FIG. 8 from a front view thereof. For convenience, the yoke can be formed by a plurality of yoke plates, for example, the yoke 20 is formed by two L-shaped yoke plates 202, 202' and a U-shaped yoke plate 203, as shown in FIG. 6A. The L-shaped yoke plates 202 and 202' are disposed symmetrically with longer sides contacting to each other. The longer sides of the L-shaped yoke plates 202 and 202' form the path 200. The shorter sides of the L-shaped yoke plates 202 and 202' form a side of the frame 201. Thus, an "8"-shaped yoke 20 is formed. The coil 25 (as shown in FIG. 2A) can be disposed around the path 200. Next, the L-shaped yoke plates 202 and 202' and the U-shaped yoke plate 203 are connected to complete manufacturing of the yoke 20.

Figure 6B:
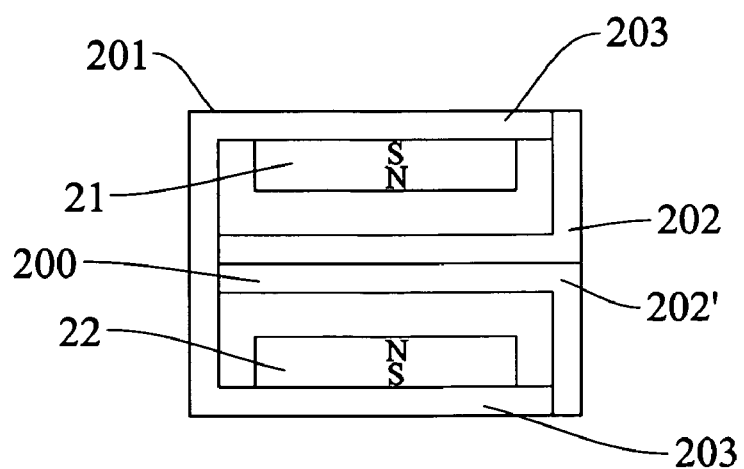
FIG. 6B is a cross section of another combination of a yoke, a first magnet, and a second magnet of embodiments of a magnetic actuator.

Another manufacturing method of the yoke 20 is shown in FIG. 6B. The shorter sides of the L-shaped yoke plates 202 and 202' extend to an edge of the frame 201 of the yoke 20. The inner edges of the L-shaped yoke plates 202 and 202' and the U-shaped yoke plate 203 are connected to complete manufacturing of the yoke 20.

Figure 6C:
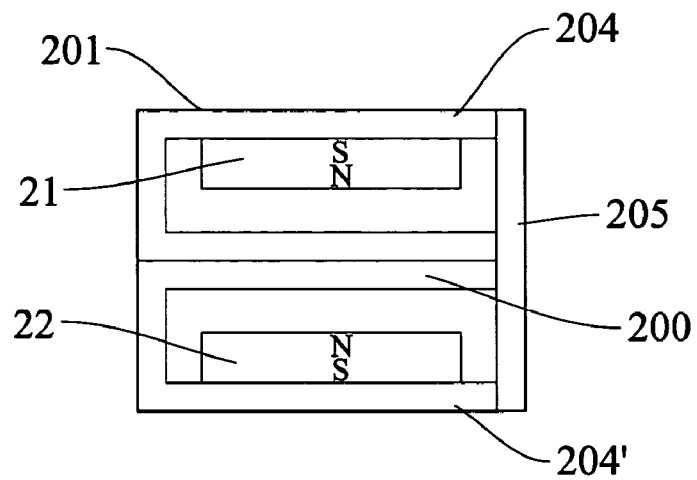
FIG. 6C is a cross section of yet another combination of a yoke, a first magnet, and a second magnet of embodiments of a magnetic actuator.

FIG. 6C is a cross section of another combination of a yoke. The yoke 20 comprises two U-shaped yoke plates 204 and 204' and a flat yoke plate 205. The sides of the U-shaped yoke plates 204 are symmetrically disposed side by side with openings in the same direction. The contacting sides of the U-shaped yoke plates 204 and 204' form the path 200. The other sides of the U-shaped yoke plates 204 and 204' form the three sides of the frame 201. The flat yoke plate 205 is disposed on the ends of the U-shaped yoke plates 204 and 204', forming the fourth side of the frame 201. Thus, an "8"-shaped yoke 20 is formed. Furthermore, the flat yoke plate 205 can extend to an edge of the frame 201, as shown in FIG. 6C.

Figure 6D:
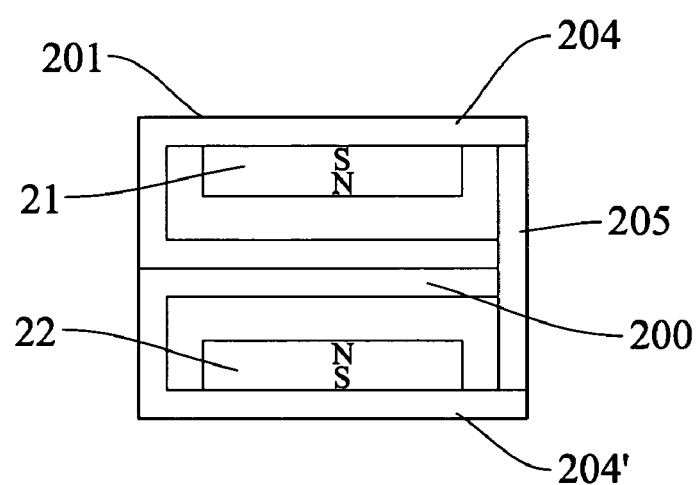
FIG. 6D is a cross section of still another combination of a yoke, a first magnet, and a second magnet of embodiments of a magnetic actuator.

FIG. 6D is a cross section of another combination of a yoke 20. The flat yoke plate 205 is disposed on the inner edges of the other two sides of the U-shaped yoke plates 204, 204'. The contacting sides of the U-shaped yoke plates 204, 204' are shortened. Thus, an 8-shaped yoke is formed.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A magnetic actuator for adjusting an iris diaphragm in an optical device, comprising:
    a yoke, comprising a first opening and a second opening, a frame encircling the first opening and the second opening, and a path located between the first opening and the second opening;
    a first magnet, disposed in the first opening in the vicinity of the frame;
    a second magnet, disposed in the second opening in the vicinity of the frame;
    a coil, surrounding the path; and
    a light shield, connected to an end of the coil, wherein when current passes through the coil, the coil moves along the path by a magnetic induction between the first magnet and the second magnet so that the iris diaphragm of the optical device is adjustable by the light shield.

2. The magnetic actuator as claimed in claim 1, wherein a cross section of the path in the moving direction of the coil is circular, rectangular or polygonal.

3. The magnetic actuator as claimed in claim 1, wherein the first magnet or the second magnet closely contacts an inner wall of the frame.

4. The magnetic actuator as claimed in claim 1, wherein a cross section of the first magnet or the second magnet in the moving direction of the coil is circular, rectangular or polygonal.

5. The magnetic actuator as claimed in claim 1, wherein the first magnet and the second magnet are arranged with the same polarity facing each other.

6. The magnetic actuator as claimed in claim 1, wherein the first magnet and the second magnet have substantially the same size and shape.

7. The magnetic actuator as claimed in claim 1, further comprising a shaft, extending from a side of the coil opposing to the light shield, and the shaft comprises a hole; and when current passes through the coil, the coil is magnetically induced by the first magnet and the second magnet such that the coil moves in a circular motion with respect to the hole as a center point for the light shield to adjust the iris diaphragm.

8. The magnetic actuator as claimed in claim 7, wherein the shaft is perpendicular to the path.

9. The magnetic actuator as claimed in claim 1, wherein the yoke comprises two L-shaped yoke plates and a U-shaped yoke plate; the L-shaped yoke plates are disposed symmetrically, constituting the path and one side of the frame, and the U-shaped yoke plate constitutes the other three sides of the frame or the yoke comprises two U-shaped yoke plates and a flat yoke late each U-shaped yoke plate comprises a side and the sides thereof are symmetrically arranged, contacting each other and pointing in the same direction to form the path and the three sides of the frame; the flat yoke plate forms another side of the frame.

10. The magnetic actuator as claimed in claim 1, wherein the magnetic actuator is applicable to an optical device, comprises an optical projector, a rear projector, or a camera.

11. A magnetic actuator for adjusting an iris diaphragm in an optical device, comprising:
    a yoke, comprising a first opening and a second opening, a frame encircling the first opening and the second opening, and a path located between the first opening and the second opening;
    a first magnet, disposed in the first opening, contacting a side of the path; a second magnet, disposed in the second opening, contacting another side of the path;
    a coil, surrounding the path, the first magnet, and the second magnet; and
    a light shield, connected to an end of the coil; wherein when current passes through the coil; the coil moves along the path by magnetic induction between the first magnet and the second magnet so that the iris diaphragm of the option device is adjustable by the light shield.

12. The magnetic actuator as claimed in claim 11, wherein a cross section of the path in the moving direction of the coil is circular, rectangular or polygonal.

13. The magnetic actuator as claimed in claim 11, wherein a cross section of the first magnet or the second magnet in the moving direction of the coil is circular, rectangular or polygonal 14. The magnetic actuator as claimed in claim 11, wherein the first magnet and the second magnet are arranged with the same polarity facing each other 15. The magnetic actuator as claimed in claim 11, wherein the first magnet and the second magnet have substantially the same size and shape.

16. The magnetic actuator as claimed in claim 11, further comprising a shaft, extending from a side of the coil opposing to the light shield, and the shaft comprises a hole; and when current passes through the coil, the coil is magnetically induced by the first magnet and the second magnet such that the coil moves in a circular motion with respect to the hole as a center point for the light shield to adjust the iris diaphragm 17. The magnetic actuator as claimed in claim 16, wherein the shaft is perpendicular to the path.

18. The magnetic actuator as claimed in claim 11, wherein the yoke comprises two L-shaped yoke plates and a U-shaped yoke plate; the L-shaped yoke plates are disposed symmetrically, constituting the path and one side of the frame, and the U-shaped yoke plate constitutes the other three sides of the frame; or the yoke comprises two U-shaped yoke plates and a flat yoke plate; each U-shaped yoke plate comprises a side, and the sides thereof are symmetrically arranged, contacting each other and pointing in the same direction to form the path and the three sides of the frame; the flat yoke plate forms another side of the frame.

19. The magnetic actuator as claimed in claim 11, wherein the magnetic actuator is applicable to an optical device, comprises an optical projector, a rear projector, or a camera.

* * * * *